US010002182B2

(12) United States Patent
Ravid

(10) Patent No.: US 10,002,182 B2
(45) Date of Patent: Jun. 19, 2018

(54) SYSTEM AND METHOD FOR COMPUTERIZED IDENTIFICATION AND EFFECTIVE PRESENTATION OF SEMANTIC THEMES OCCURRING IN A SET OF ELECTRONIC DOCUMENTS

(71) Applicant: Microsoft Israel Research and Development (2002) LTD, Haifa (IL)

(72) Inventor: Yiftach Ravid, Rosh Haayin (IL)

(73) Assignee: MICROSOFT ISRAEL RESEARCH AND DEVELOPMENT (2002) LTD, Haifa (IL)

( * ) Notice: Subject to any disclaimer, the term of this patent is extended or adjusted under 35 U.S.C. 154(b) by 101 days.

(21) Appl. No.: 14/161,221

(22) Filed: Jan. 22, 2014

(65) Prior Publication Data

US 2014/0207783 A1    Jul. 24, 2014

Related U.S. Application Data

(60) Provisional application No. 61/755,242, filed on Jan. 22, 2013.

(51) Int. Cl.
G06F 17/30 (2006.01)

(52) U.S. Cl.
CPC .. *G06F 17/30604* (2013.01); *G06F 17/30598* (2013.01); *G06F 17/30699* (2013.01)

(58) Field of Classification Search
None
See application file for complete search history.

(56) References Cited

U.S. PATENT DOCUMENTS

| 6,208,988 B1 | 3/2001 | Schultz |
| 7,158,961 B1 | 1/2007 | Charikar |
| 7,421,395 B1 * | 9/2008 | Link ............... G06Q 50/01 705/319 |

(Continued)

FOREIGN PATENT DOCUMENTS

| WO | 2006008733 A2 | 1/2006 |
| WO | 2007086059 A2 | 8/2007 |

(Continued)

OTHER PUBLICATIONS

Christos H. Papadimitriou et al "Latent Semantic Indexing: A Probabilistic Analysis" Proceedings of the seventeenth ACM SIGACT-SIGMOD-SIGART symposium on Principles of database systems. ACM, (1998).

(Continued)

*Primary Examiner* — Aleksandr Kerzhner
*Assistant Examiner* — Eddy Cheung
(74) *Attorney, Agent, or Firm* — Jacob P. Rohwer; Scott Y. Shigeta; Newport IP, LLC

(57) ABSTRACT

System and method for computerized identification and presentation of semantic themes occurring in a set of electronic documents, comprising performing topic modeling on the set of documents thereby to yield a set of topics and for each topic, a topic-modeling output list of words; and using a processor performing a matching algorithm to match only a subset of each topic-modeling output list of words, to the output list's corresponding topic, such that each word appears in no more than a predetermined number of subsets from among said subsets.

20 Claims, 11 Drawing Sheets

---

801. Put the first top N words from ThemeWordsList, into ThemeWordsInName.

↓

802. If any word appears in more than one ThemeWordsInName, discard that word from those themes' lists, and insert into the Nth position of those lists the word that is in the N+1'th position in the respective ThemeWordsList lists. Alternatively, retain the repeating word only in one ThemeWordsInName list, e.g. the list where the word-in-theme probability for the repeating word is the highest, and in the remaining lists discard the repeating word and insert into the Nth position of the remaining lists the word that is in the N+1'th position in the respective ThemeWordsList lists.

↓

803. Again go over all ThemeWordsInName lists. If there is still a word that appears in more than one list, discard that word from those lists (or from all but one of those lists, e.g. all but the list where the word-in-theme probability for the repeating word is the highest), and insert in the last position in those lists (or in those lists other than the one where the word-in-theme probability for the repeating word is the highest) the next word from the top of the respective ThemeWordsList, that was not yet inserted in ThemeWordsInName.

↓

804. Continue similarly, until:
the words in all ThemeWordsInName lists are distinct from one other; or until the words in ThemeWordsInName lists appear exactly once across all ThemeWordsInName lists.

(56) References Cited

U.S. PATENT DOCUMENTS

| | | | |
|---|---|---|---|
| 7,980,247 | B2 | 7/2011 | Boehm et al. |
| 8,015,124 | B2 | 9/2011 | Milo et al. |
| 8,346,685 | B1 | 1/2013 | Ravid |
| 8,359,365 | B2 | 1/2013 | Sitsky et al. |
| 8,391,614 | B2 | 3/2013 | Ravid et al. |
| 2002/0065857 | A1* | 5/2002 | Michalewicz ...... G06F 17/3071 715/259 |
| 2002/0111792 | A1* | 8/2002 | Cherny ................. G06F 17/277 704/8 |
| 2003/0195937 | A1 | 10/2003 | Kircher et al. |
| 2004/0098389 | A1 | 5/2004 | Jones et al. |
| 2004/0163034 | A1* | 8/2004 | Colbath .................. G10L 15/28 715/230 |
| 2005/0060643 | A1 | 3/2005 | Glass et al. |
| 2007/0043774 | A1 | 2/2007 | Davis et al. |
| 2007/0150404 | A1* | 6/2007 | Golle .................... G06Q 40/04 705/37 |
| 2007/0156732 | A1 | 7/2007 | Surendran et al. |
| 2007/0283410 | A1 | 12/2007 | Hsu |
| 2008/0243820 | A1* | 10/2008 | Chang ................. G06F 17/2785 |
| 2009/0094233 | A1* | 4/2009 | Marvit ................ G06F 17/3071 |
| 2009/0204609 | A1* | 8/2009 | Labrou ............... G06F 17/3064 |
| 2009/0198677 | A1 | 9/2009 | Tsutsui Chikara |
| 2009/0254884 | A1* | 10/2009 | Rama ........................ G06F 8/75 717/124 |
| 2009/0276467 | A1 | 11/2009 | Scholtes et al. |
| 2009/0282086 | A1 | 11/2009 | Heimes |
| 2010/0254615 | A1 | 10/2010 | Kantor et al. |
| 2010/0332428 | A1 | 12/2010 | McHenry et al. |
| 2011/0040837 | A1 | 2/2011 | Eden et al. |
| 2011/0191098 | A1* | 8/2011 | Thomas .................. G06F 17/27 704/9 |
| 2012/0095952 | A1 | 4/2012 | Archambeau et al. |
| 2012/0117082 | A1* | 5/2012 | Koperda ............. G06F 17/3053 707/748 |
| 2012/0215749 | A1 | 8/2012 | Van Beneden et al. |
| 2012/0278266 | A1 | 11/2012 | Naslund et al. |
| 2014/0149417 | A1* | 5/2014 | Kim .................. G06F 17/30699 707/740 |
| 2014/0195518 | A1 | 7/2014 | Kelsey et al. |
| 2014/0207782 | A1 | 7/2014 | Ravid |
| 2014/0207786 | A1 | 7/2014 | Tal-Rothschild et al. |
| 2015/0046151 | A1 | 2/2015 | Lane et al. |
| 2015/0113388 | A1 | 4/2015 | Barrett et al. |

FOREIGN PATENT DOCUMENTS

| | | | |
|---|---|---|---|
| WO | 2009004324 A1 | 1/2009 | |
| WO | WO 2013037044 A1 * | 3/2013 | ......... G06Q 30/0207 |

OTHER PUBLICATIONS

Hofmann, Thomas. "Probabilistic latent semantic indexing." Proceedings of the 22nd annual international ACM SIGIR conference on Research and development in information retrieval. ACM, (1999).

David M. Blei et al "Latent dirichlet allocation". The Journal of machine Learning research 3: 993-1022. (2003).

David M. Blei "Probabilistic topic models." Communications of the ACM 55:4: 77-84. (2012).

Sanjeev Arora et al "Learning topic models—going beyond SVD." Foundations of Computer Science (FOCS), IEEE 53rd Annual Symposium on. IEEE,1-21 (2012).

Mark Girolami et al "On an equivalence between PLSI and LDA". Proceedings of the 26th annual international ACM SIGIR conference on Research and development in information retrieval. ACM, 1-2 (2003).

Thomas L. Griffiths "Finding scientific topics". Proceedings of the National academy of Sciences of the United States of America 101: 1: 5228-5235 (2004).

Thomas Minka et al "Expectation-propagation for the generative aspect model" Proceedings of the Eighteenth conference on Uncertainty in artificial intelligence. Morgan Kaufmann Publishers Inc. ,352-359 (2002).

David M. Blei et al "Correlated topic models" Advances in neural information processing systems. 18:147:1-8. (2006).

David M. Blei et al "Hierarchical topic models and the nested Chinese restaurant process" Advances in neural information processing systems 16:17:1-8 (2004).

Liangcai Shu et al "A latent topic model for complete entity resolution" Data Engineering, 2009. ICDE'09. IEEE 25th International Conference on. IEEE, 1-12 (2009).

Daniele Quercia et al "TweetLDA: supervised topic classification and link prediction in Twitter." Proceedings of the 3rd Annual ACM Web Science Conference. ACM, 978-1-4503-1228-8:1-4 (2012).

Li Fei-Fei "A bayesian hierarchical model for learning natural scene categories" Computer Vision and Pattern Recognition, 2005. CVPR 2005. IEEE Computer Society Conference on. vol. 2. IEEE, 1-8 (2005).

Xiaogang Wang et al "Spatial latent dirichlet allocation."Advances in Neural Information Processing Systems. 1-8 (2008).

Wikipedia, the free encyclopedia. "Topic model" http://en.wikipedia.org/wiki/Topic_model (Jan. 2013).

Wikipedia, the free encyclopedia. "Latent Dirichlet allocation" http://en.wikipedia.org/wiki/Latent_Dirichlet_allocation#Topics_in_LDA 1-5 (Jan. 2013).

Wikipedia, the free encyclopedia. "Data deduplication" http://en.wikipedia.org/wiki/Data_deduplication 1-3 (Dec. 2013).

Wikipedia, the free encyclopedia. "Record Linkage" http://en.wikipedia.org/wiki/Record_linkage 1-5 (Dec. 2013).

"Mining Value from Email Threading and Analytics" http://www.contentanalyst.com/html/markets/markets_legal_email_threading.html (Jan. 2014).

David M. Blei "Topic Modeling". http://www.cs.princeton.edu/~blei/topicmodeling.html (Jan. 2014).

Pradheep K Elango et al "Clustering images using the latent dirichlet allocation model." University of Wisconsin 1-18 (2005).

Gerber Art "Equivio Zoom User Guide", 3.1 : 1-195 (2013).

Mark Steyvers et al "Probabilistic topic models." Handbook of latent semantic analysis 427.7 ; 424-440 (2007).

"The Matching Process" The matching national resident matching program. http://www.nrmp.org/match-process/match-algorithm/ 1-2 (Jan. 2014).

Manlove, D. F. et al "Hard variants of stable marriage." Theoretical Computer Science 276: 1 : 261-279 (2002).

"Topic Modeling in the Humanities: An Overview" http://mith.umd.edu/topic-modeling-in-the-humanities-an-overview/ 1-3 (Jan. 2014).

Wikipedia, the free encyclopedia. "National Resident Matching Program" http://en.wikipedia.org/wiki/National_Resident_Matching_Program 1-6 (Jan. 2014).

"Multi-Jurisdiction Policy Management" RSD Glass http://www.rsd.com/en/products/rsd-glass-policy-manager. 1-3 (2013).

Wikipedia, the free encyclopedia. "Precision and Recall" http://en.wikipedia.org/wiki/Precision_and_recall (2013).

Equivio, "USDOJ Adopts Equivio Technology for Near-Duplicate and Email Thread Analysis", Press Release 2008, «http://www.equivio.com/press_itme.php?ID=14», 2 pages.

Office Action for U.S. Appl. No. 14/161,159 dated Nov. 12, 2015, Ravid, "System and Method for Computerized Semantic Processing of Electronic Documents Including Themes", 33 pages.

Office Action for U.S. Appl. No. 14/062,233 dated Nov. 4, 2015, Tal-Rothschild, et al., "System and Methods for Computerized Information Governance of Electronic Documents", 34 pages.

Office action for U.S. Appl. No. 14/062,233, dated May 16, 2016, Tal-Rothschild et al., "System and Methods for Computerized Information Governance of Electronic Documents", 36 pages.

Office action for U.S. Appl. No. 14/161,159, dated May 3, 2016, Ravid, "System and Method for Computerized Semantic Processing of Electronic Documents Including Themes", 9 pages.

Office Action for U.S. Appl. No. 14/161,159, dated Aug. 12, 2016, Yiftach Ravid, "System and Method for Computerized Semantic Processing of Electronic Documents Including Themes", 21 pages.

(56) References Cited

OTHER PUBLICATIONS

Office action for U.S. Appl. No. 14/062,233, dated Aug. 25, 2016, Tal-Rothschild et al., "System and Methods for Computerized Information Governance of Electronic Documents", 35 pages.
Office action for U.S. Appl. No. 14/161,159 dated Jan. 11, 2017, Ravid, "System and Method for Computerized Semantic Processing of Electronic Documents Including Themes", 24 pages.
Office action for U.S. Appl. No. 14/062,233, dated Feb. 10, 2017, Tal-Rothschild et al., "System and Methods for Computerized Information Governance of Electronic Documents", 37 pages.
"Non-Final Office Action Issued in U.S. Appl. No. 14/161,159", dated May 25, 2017, 24 Pages.
U.S. Appl. No. 14/062,233—Final Office Action dated Jan. 9, 2018, 11 pages.
U.S. Appl. No. 14/161,159—Final Office Action dated Nov. 6, 2017, 21 pages.
U.S. Appl. No. 14/062,233—Non Final Office Action dated Jun. 16, 2017, 13 pages.

\* cited by examiner

Fig. 1b

30: check does the "hospital" (=theme) have an unfilled position (does the "hospital" (=theme) have less than 5 (say) words in its theme-name)?

⬇

40: If yes, tentatively match "applicant" (= word) to "hospital" (=theme) (optional: only if "hospital" (=theme) list has indicated that "applicant" (= word) is acceptable) and continue to next "applicant" (= word) (i.e. back to step 10)

⬇

50: if not (if the "hospital" (=theme) does not have an unfilled position), is the "applicant" (= word) is more preferred by the "hospital" (=theme) than another "applicant" (= word) A- who already is tentatively matched to the "hospital" (=theme)? If yes, cancel the tentative match between the "hospital" (=theme) and "applicant" (= word) A-, tentatively match "applicant" (= word) A to "hospital" (=theme) and continue to next "applicant" (= word) (i.e. back to step 10). If not, continue to next "hospital" (=theme) (i.e. back to step 20)

(In case applicant A gets no tentative match and all the applicant's choices on the ROL are exhausted, omit that topic)

80: Input NWinName /* NWinName= maximum number of words that will appear in a theme name. default may for example be 5, or any other integer between 1 and 10 */

↓

90. Set : NWinTheme = Min( Max(2*NWinName,20), vocabularySizeInThemeAlgorithm ) /* NWinTheme = maximum number of words from each theme, to be used for this process. vocabularySizeInThemeAlgorithm =Number of distinct words appearing in all documents used for automated theme generation

↓

100: If (NWinTheme > vocabularySizeInThemeAlgorithm), set result = 'fail' and goto step 400

↓

101. Initialize (e.g. as per Fig. 3A for each theme):

create an empty ThemeWordsInName list; and insert, to ThemeWordsList, the top NWinTheme words along with their respective word-in-theme probabilities. The words in the list are ordered by their respective probability, from highest to lowest;

↓

200: Set iPos=1 = position of word in all theme names. The ThemeWordsInName lists, for each theme, are now (in the loop starting here at step 200) filled with words assigned to each theme's name.

↓ go to Fig. 2b, step 210

FIG. 3a

102: For each theme t, create a list ThemeWordsList[t]: a list of NWinTheme words, ordered by word-in-theme probability generated by topic modeling process, from high to low. Each theme t will choose the words that are to appear in its name from its own list of words, ThemeWordsList[t].

↓

103: For each theme t, create a list ThemeWordsInName[t], storing words that are to appear in the theme name. Initially all ThemeWordsInName[t] lists are empty.

↓

104: Set DistinctWordsList: a list of all distinct words that appear in all ThemeWordsList's.

FIG. 3b

222: For each theme t, create a new list - ThemeWordsCandidates[t]. The list will contain all the words the theme will try to assign to itself for the current word position.

↓

223: Set that all words in DistinctWordsList are not candidates of any theme.

FIG. 8

801. Put the first top N words from ThemeWordsList, into ThemeWordsInName.

↓

802. If any word appears in more than one ThemeWordsInName, discard that word from those themes' lists, and insert into the Nth position of those lists the word that is in the N+1'th position in the respective ThemeWordsList lists. Alternatively, retain the repeating word only in one ThemeWordsInName list, e.g. the list where the word-in-theme probability for the repeating word is the highest, and in the remaining lists discard the repeating word and insert into the Nth position of the remaining lists the word that is in the N+1'th position in the respective ThemeWordsList lists.

↓

803. Again go over all ThemeWordsInName lists. If there is still a word that appears in more than one list, discard that word from those lists (or from all but one of those lists, e.g. all but the list where the word-in-theme probability for the repeating word is the highest), and insert in the last position in those lists (or in those lists other than the one where the word-in-theme probability for the repeating word is the highest) the next word from the top of the respective ThemeWordsList, that was not yet inserted in ThemeWordsInName.

↓

804. Continue similarly, until:
the words in all ThemeWordsInName lists are distinct from one other; or until the words in ThemeWordsInName lists appear exactly once across all ThemeWordsInName lists.

SYSTEM AND METHOD FOR COMPUTERIZED IDENTIFICATION AND EFFECTIVE PRESENTATION OF SEMANTIC THEMES OCCURRING IN A SET OF ELECTRONIC DOCUMENTS

Priority is claimed from U.S. Provisional Patent Application No. 61/755,242, entitled "Computerized systems and methods for use of themes in e-discovery" and filed Jan. 22, 2013, the entire contents of which are hereby incorporated by reference.

FIELD OF THIS DISCLOSURE

The present invention relates generally to computerized processing of electronic documents and more particularly to computerized semantic processing of electronic documents.

BACKGROUND FOR THIS DISCLOSURE

In connection with the National Resident Matching Program, which is an example of a state of the art large-scale matching scheme, the hospital-residents problem (how to match hospitals to residents) is described as follows (emphasis added), at http location //eprints.gla.ac.uk/15/1/hvsm.pdf.

"A generalisation of SM (Stable Marriage problem) occurs when the preference lists of those involved can be incomplete.

In this case, we say that person p is acceptable to person q if p appears on the preference list of q, and unacceptable otherwise. We use SMI to stand for this variant of SM where preference lists may be incomplete. A matching M in an instance I of SMI is a one-one correspondence between a subset of the men and a subset of the women, such that (m;w) 2 M implies that each of m;w is acceptable to the other. The revised notion of stability may be defined as follows: M is stable if there is no (man,woman) pair (m;w), each of whom is either unmatched in M and finds the other acceptable, or prefers the other to his/her partner in M1. (It follows from this definition that, from the point of view of finding stable matchings, it may be assumed, without loss of generality, that p is acceptable to q if and only if q is acceptable to p.) A stable matching in I need not be a complete matching. However, all stable matchings in I have the same size, and involve exactly the same men and exactly the same women [4]. It is a simple matter to extend the Gale/Shapley algorithm to cope with preference lists that may be incomplete (see [6, Section 1.4.2]).

"We shall refer to the classical many-one generalisation of the (one-one) problem SMI, which is relevant in a number of important applications, as the Hospitals/Residents problem (HR) [6, 22]. An instance I of HR involves a set of residents and a set of hospitals, each resident seeking a post at one hospital, and the i'th hospital . . . . Each resident strictly ranks a subset of the hospitals, and each hospital strictly ranks its applicants. A matching M in I is an assignment of each resident to at most one hospital so that, for each i, at most ci residents are assigned to the ith hospital. Matching M is stable if there is no (resident,hospital) pair (r; h) such that (i) r; h find each other acceptable, (ii) r is either unassigned or prefers h to his assigned hospital, and (iii) h either has an unfilled post or prefers r to at least one of the residents assigned to it. Again, the Gale/Shapley algorithm may be extended to find a stable matching for a given instance of HR."

A conventional method for matching hospitals to residents is described in the NRMP website as follows:

"The process begins with an attempt to match an applicant to the program most preferred on that applicant's rank order list (ROL). If the applicant cannot be matched to that first choice program, an attempt is made to place the applicant into the second choice program, and so on, until the applicant obtains a tentative match or all the applicant's choices on the ROL have been exhausted.

A tentative match means a program on the applicant's ROL also ranked that applicant and either:
the program has an unfilled position, in which case there is room in the program to make a tentative match between the applicant and program, or
the program does not have an unfilled position, but the applicant is more preferred by the program than another applicant who already is tentatively matched to the program. In that case, the applicant who is less preferred by the program is removed to make room for a tentative match with the more preferred applicant.

Matches are "tentative" because an applicant who is matched to a program may be removed from that program to make room for an applicant more preferred by the program. When an applicant is removed from a tentative match, an attempt is made to re-match that applicant, starting from the top of the applicant's ROL. This process is carried out for all applicants until each applicant has either been tentatively matched to the most preferred choice possible or all choices submitted by the applicant have been exhausted.
When the Match is complete, all tentative matches become final."

A greedy algorithm is a computerized functionality which employs a problem solving heuristic of making, at each stage, a locally optimal choice rather than determining and making the globally optimal choice.

State of the art related technologies are described inter alia in:

1. Papadimitriou, Christos; Raghavan, Prabhakar; Tamaki, Hisao; Vempala, Santosh (1998). "Latent Semantic Indexing: A probabilistic analysis" (Postscript). Proceedings of ACM PODS. http://www.cs.berkeley.edu/~christos/ir.ps.
2. Hofmann, Thomas (1999). "Probabilistic Latent Semantic Indexing" (PDF). Proceedings of the Twenty-Second Annual International SIGIR Conference on Research and Development in Information Retrieval. http://www-.cs.brown.edu/~th/papers/Hofmann-SIGIR99.pdf.
3. Blei, David M.; Ng, Andrew Y.; Jordan, Michael I; Lafferty, John (January 2003). "Latent Dirichlet allocation". Journal of Machine Learning Research 3: 993-1022. doi:10.1162/jmlr 2003.3.4-5.993. http://jmlr csail.mit.edu/papers/v3/blei03a.html.
4. Blei, David M. (April 2012). "Introduction to Probabilistic Topic Models" (PDF). Comm. ACM 55 (4): 77-84. doi:10.1145/2133806.2133826. http://www.cs.princeton-.edu/~blei/papers/Blei2011.pdf
5. Sanjeev Arora; Rong Ge; Ankur Moitra (April 2012). "Learning Topic Models—Going beyond SVD". arXiv: 1204.1956.
6. Girolami, Mark; Kaban, A. (2003). "On an Equivalence between PLSI and LDA". Proceedings of SIGIR 2003. New York: Association for Computing Machinery. ISBN 1-58113-646-3.
7. Griffiths, Thomas L.; Steyvers, Mark (Apr. 6, 2004). "Finding scientific topics". Proceedings of the National Academy of Sciences 101 (Suppl. 1): 5228-5235. doi: 10.1073/pnas.0307752101. PMC 387300. PMID 14872004.
8. Minka, Thomas; Lafferty, John (2002). "Expectation-propagation for the generative aspect model". Proceedings of the 18th Conference on Uncertainty in Artificial Intelligence. San Francisco, Calif.: Morgan Kaufmann ISBN 1-55860-897-4.
9. Blei, David M.; Lafferty, John D. (2006). "Correlated topic models". Advances in Neural Information Processing Systems 18.
10. Blei, David M.; Jordan, Michael I.; Griffiths, Thomas L.; Tenenbaum; Joshua B (2004). "Hierarchical Topic Models and the Nested Chinese Restaurant Process". Advances in Neural Information Processing Systems 16: Proceedings of the 2003 Conference. MIT Press. ISBN 0-262-20152-6.
11. Quercia, Daniele; Harry Askham, Jon Crowcroft (2012). "TweetLDA: Supervised Topic Classification and Link Prediction in Twitter". ACM WebSci.
12. Li, Fei-Fei; Perona, Pietro. "A Bayesian Hierarchical Model for Learning Natural Scene Categories". Proceedings of the 2005 IEEE Computer Society Conference on Computer Vision and Pattern Recognition (CVPR'05) 2: 524-531.
13. Wang, Xiaogang; Grimson, Eric (2007). "Spatial Latent Dirichlet Allocation". Proceedings of Neural Information Processing Systems Conference (NIPS).

Topic modeling (Wikipedia): In machine learning and natural language processing, a topic model is a type of statistical model for discovering the abstract "topics" that occur in a collection of documents. An early topic model was described by Papadimitriou, Raghavan, Tamaki and Vempala in 1998. [1] Another one, called Probabilistic latent semantic indexing (PLSI), was created by Thomas Hofmann in 1999. [2] Latent Dirichlet allocation (LDA), perhaps the most common topic model currently in use, is a generalization of PLSI developed by David Blei, Andrew Ng, and Michael Jordan in 2002, allowing documents to have a mixture of topics. [3] Other topic models are generally extensions on LDA, such as Pachinko allocation, which improves on LDA by modeling correlations between topics in addition to the word correlations which constitute topics. Although topic models were first described and implemented in the context of natural language processing, they have applications in other fields such as bioinformatics.

Topics in LDA (Wikipedia): In LDA, each document may be viewed as a mixture of various topics. This is similar to probabilistic latent semantic analysis (pLSA), except that in LDA the topic distribution is assumed to have a Dirichlet prior. In practice, this results in more reasonable mixtures of topics in a document. It has been noted, however, that the pLSA model is equivalent to the LDA model under a uniform Dirichlet prior distribution. [12]

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide computerized systems and methods for use of themes in e-discovery and other semantic tasks.

A topic modeling overview available on the website at the following http location: mith.umd.edu/topic-modeling-in-the-humanities-an-overview/, states (emphasis added) that:

"[A] standard toolkit like MALLET gives a sense of the relative importance of topics in the composition of each document, as well as a list of the most prominent words in each topic. The word lists define the topics—it's up to practitioners to discern meaning in the topics and to give them names."

Certain embodiments of the present invention seek to provide a method in which a processor is used to improve word lists which define topics identified in computerized topic modeling processes; in contrast, conventional word lists provided as cues to a topic's semantic content, are simply a top portion of a ranked list of keywords generated by the topic modeling process.

There is thus provided, in accordance with at least one embodiment of the present invention, a computerized method for identifying and naming topics in a set of documents.

According to certain embodiments:
a. topic modeling is performed, thereby to yield a pre-requested or pre-programmed number of topics each represented by a word-list. Each topic may be deemed to represent a semantic theme.
b. Next the top un-used word of a first theme's topic-modeling word-list is used as that theme name's next word, unless the top un-used word appears on a "words already used" list in which case the next un-used word on the list is used as that theme's name's next word. The theme's name's next word is then added to a "words already used" list. Preferably, the current location on the first theme's word-list is recorded.
c. The above process is repeated for the $2^{nd}, 3^{rd}, \ldots$ themes, till the last theme is reached; this results in a set of preliminary theme names, one for each theme, each preliminary theme name including one word.
d. Then, the method returns to the first theme and adds another word to each theme's name, in the same way. This may be repeated until each theme has 5 (say) words.

The above method is useful for computerized identification and presentation of semantic themes occurring in a set of electronic documents, including effecting topic modeling on the set of documents thereby to yield a set of topics and for each topic, a topic-modeling output list of words; and using a processor performing a matching algorithm to match only a subset of each topic-modeling output list of words, to the output list's corresponding topic, such that each word appears in no more than a predetermined number of subsets from among said subsets.

It is appreciated that any suitable matching method may be used in conjunction with certain embodiments of the present invention, such as but not limited to Stable Marriage and Hospital-Residents-type matching methods. To give another example among many, the following greedy algorithm may be employed:
  i. pick the word, in a theme, which has the highest word score
  ii. assign that word to be the theme's name
  iii. remove that word from all other themes' names, to the extent it appears
  iv. Pick and assign to the theme or to another theme, a second best word.
  v. add words to each topic only until that topic has reached the pre-defined maximum number of words per-topic, or earlier.

It is appreciated that the ordering defining which theme is first and which is last (i.e. in which order, over the themes, to perform step b) may be any suitable ordering such as a random ordering, or such as a ranking based on themes' relative "importance" in any suitable, application-specific (e.g. programmable) sense. For example themes may be ordered by the number of documents per theme, or in an order selected by a human user, or in order of relevance to a selected subject e.g. e-discovery target subject, and so forth.

It is appreciated that if a word appears in a high position in two (or more) themes' topic-modeling word-lists and is hence a candidate to be included in the names of both (or more) of these, the word need not be included arbitrarily in the higher-ordered theme's name, e.g. in the $5^{th}$ theme name rather than the $11^{th}$ theme name or in the $2^{nd}$ theme name and not in the $37^{th}$ and $48^{th}$ themes' names. This is especially the case when the ordering is arbitrarily determined. Instead, alternative name-options, including various words but not the "contested" word, may be developed for each of the $5^{th}$ and $11^{th}$ themes; or each of the $2^{nd}$, $37^{th}$ and $48^{th}$ themes, and the "quality" of the alternative name-options available to the $5^{th}$ and $11^{th}$ themes; or to the $2^{nd}$, $37^{th}$ and $48^{th}$ themes, may be compared. The "contested" word may then be assigned, preferentially, to the individual theme which "needs" the "contested" word most because the individual theme's alternative name-options (sets of words that could serve as names) are least good, relative to the alternative name-options available to the other themes competing for the "contested" word.

Any suitable criteria for determining quality of a name e.g. suitability of a set of words to serve as the name of a particular theme, may be employed e.g. as described herein with reference to step 300 in the method of FIG. 4 or e.g. using suitable parameters generated by LDA or other topic modeling techniques such as LDA. For example, aspects of the distribution of words in topic k as computed e.g. by LDA, may be helpful in establishing suitability of a set of words to serve as the name of a particular theme because the words used as a theme's name should appear frequently (high probability) in topic k.

According to certain embodiments, name quality is determined by comparing name quality when the name includes 5 (say) words to name quality when the name includes only 3 (say) words. For example, the probability of each of the 5 words to be included in the theme may be computed; if this probability declines sharply within the 5 words, then the words after the decline are discarded from the name because they are considered to contribute only peripherally if at all to the quality of the name. For example, if the probabilities for a particular theme are 0.6, 0.3, 0.01, 0.01, 0.01 then only the first two words would be retained in this theme's name. The precise word-discarding criterion in this method may for example be either (a) a threshold on the ratio between the probabilities of the first word/s and subsequent words (e.g. in this case, 0.01/0.6 is below a threshold of, say, ½, ⅓, ¼, ⅛ or any other suitable value) or (b) a threshold on the actual probabilities (e.g. in this case, 0.01 is below a threshold of, say, 0.1 or 0.01 or any other suitable value), or a logical combination of at least (a) and (b).

According to certain embodiments, Analysis of variance (ANOVA) techniques may be used to explain the distribution of words within the topic. Assuming, say, that 5 is taken as the "standard" number of words to include in each theme name, then if the distribution of words in theme T is well enough explained (e.g. if the proportion of variance explained by less than 5 words is above a threshold) by adopting a "model" or "hypothesis" according to which the theme is represented by less than 5 words then less than 5 words may be employed to serve as the name for that theme. In contrast if the distribution of words in theme T is not well enough explained (e.g. if the proportion of variance explained by less than 5 words is below a threshold) by adopting a "model" or "hypothesis" according to which the theme is represented by less than 5 words (if 5 is taken as the "standard" number of words to include in each theme name) then 5 words may be employed to serve as the name for that theme.

Alternatively or in addition, ANOVA may be used to analyze the differences between groups (e.g. between words "clustering around" the first of the 5, say, words in a theme name and between words "clustering around" the other ($2^{nd}$ to $5^{th}$) words) and if little difference is found, say, between the $1^{st}$ and $4^{th}$ words then the $4^{th}$ word may be discarded from the theme name.

Alternatively or in addition, the sum of word scores of the words in a proposed name may be used to estimate quality of the proposed name, and the last word/s in the name may be eliminated if the sum exceeds a threshold even without them. The discarding decision need not be based solely on this sum and may also take into account statistical similarities between word distributions; for example "dog" and "puppy" may be found to be distributed similarly (e.g. more similarly than "dog" and "flowerpot") and therefore one might discard one of "dog" and "puppy" from a theme name including both.

If a topic is defined as a distribution over a fixed vocabulary and if each document exhibits various topics with different proportions determined by a per-document distribution over topics then each word's "score" or "word score" may be its level of probability given the distribution over the fixed vocabulary defined by the topic.

In accordance with an aspect of the presently disclosed subject matter, there is provided a method for computerized identification and presentation of semantic themes occurring in a set of electronic documents, the method comprising:

performing topic modeling on the set of documents thereby to yield a set of topics and for each topic, a topic-modeling output list of words; and using a processor performing a matching algorithm to match only a subset of each topic-modeling output list of words, to the output list's corresponding topic, such that each word appears in no more than a predetermined number of subsets from among the subsets.

In accordance with an embodiment of the presently disclosed subject matter, there is further provided a method wherein the matching algorithm comprises a hospital-residents matching algorithm and each topic's output list of words is used to indicate "hospital" (topic) preferences for "residents" (words).

In accordance with an embodiment of the presently disclosed subject matter, there is yet further provided a method wherein the predetermined number of subsets comprises one single subset.

In accordance with an embodiment of the presently disclosed subject matter, there is yet further provided a method wherein the topic modeling comprises LDA-type topic modeling.

In accordance with an embodiment of the presently disclosed subject matter, there is yet further provided a method wherein each subset has a predetermined maximum number of members such that each subset includes, at most, the maximum number of words.

In accordance with an embodiment of the presently disclosed subject matter, there is yet further provided a method wherein each subset has a predetermined number of members such that each subset includes exactly the predetermined number of words.

In accordance with an embodiment of the presently disclosed subject matter, there is yet further provided a method wherein each subset includes less than the maximum number of words if a predetermined computational criterion establishing theme name sufficiency of a set of words is satisfied.

In accordance with an embodiment of the presently disclosed subject matter, there is yet further provided a method wherein the hospital-residents matching algorithm assumes "residents" (words) have no preference between "hospitals" (topics).

In accordance with an aspect of the presently disclosed subject matter, there is yet further provided a computer program product, comprising a non-transitory tangible computer readable medium having computer readable program code embodied therein, the computer readable program code adapted to be executed to implement a method for computerized identification and presentation of semantic themes occurring in a set of electronic documents, the method comprising:

performing topic modeling on the set of documents thereby to yield a set of topics and for each topic, a topic-modeling output list of words; and using a processor performing a matching algorithm to match only a subset of each topic-modeling output list of words, to the output list's corresponding topic, such that each word appears in no more than a predetermined number of subsets from among said subsets.

The method may also comprise displaying the subsets of words as respective theme names for themes corresponding to the set of topics respectively.

The present invention also typically includes at least the following embodiments:

Embodiment 1

An e-discovery method comprising:
Step 1. Input: a set of electronic documents
Step 2: Extract text from the data collection.
Step 3: Compute Near-duplicate (ND) on the dataset.
Step 4. Compute Email threads (ET) on the dataset.
Step 5. Run a topic modeling on a subset of the dataset, including data manipulation Embodiment 2

A method according to Embodiment 1 wherein the output of step 3 includes all documents having the same DuplicateSubsetID having an identical text.

Embodiment 3

A method according to Embodiment 1 wherein the output of step 3 includes all documents x in the set for which there is another document y in the set, such that the similarity between the two is greater than some threshold.

Embodiment 4

A method according to Embodiment 1 wherein the output of step 3 includes at least one pivot document selected by a policy such as maximum words in the document.

Embodiment 5

A method according to Embodiment 1 wherein the subset includes inclusives of Email threads (ET).

Embodiment 6

A method according to Embodiment 1 wherein the subset includes Pivots from documents and attachments, but not emails.

Embodiment 7

A method according to Embodiment 1 wherein said data manipulation includes, if the document is an e-mail, removing all e-mail headers in the document, but keeping the subject line and the body of the e-mail.

Embodiment 8

A method according to Embodiment 7 and also comprising multiplying the subject line to set some weight to the subject words.

Embodiment 9

A method according to Embodiment 1 wherein said data manipulation includes Tokenization of the text using separators.

Embodiment 10

A method according to Embodiment 1 wherein said data manipulation includes ignoring the following features:
Words with length less than (parameter)
Words with length greater than (parameter)
Words that do not start with an alpha character.
(Optionally)—words that contain digits
(Optionally)—words that contain non-AlphaNumeric characters, optionally excluding some subset characters such as '_'.
Words that are stop words.
Words that appear more than (parameter) times number of words in the document.
Words that appear less than (parameter) times number of documents.
Words that appear more than (parameter) times number of documents.

Embodiment 11

A method according to Embodiment 1 wherein the output of step 5 includes an assignment of documents to the themes, and an assignment of words (features) to themes and each feature x has some probability P_xy of being in theme y and wherein the P matrix is used to construct names for at least one theme.

Embodiment 12

A method for computerized Early Case Assessment comprising:
a. Select at random a set of documents
b. Run near-duplicates (ND)
c. Run Email threads (ET)
d. Select pivot and inclusive
e. Run topic modeling;

g. Generate theme names; and
h. Explore the data by browsing themes.

Embodiment 13

A method according to Embodiment 1 wherein, for Post Case Assessment rather than using an entire dataset, only the documents that are relevant to the case are used.

Embodiment 14

A method according to Embodiment 1 and also comprising displaying for each theme the list of documents that are related to that theme.

Embodiment 15

A method according to Embodiment 14 wherein the user has an option to select a meta-data and the system will display for each theme the percentage of that meta-data in that theme.

Also provided, excluding signals, is a computer program comprising computer program code means for performing any of the methods shown and described herein when said program is run on a computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 1a-1b and FIGS. 2a-2b, taken together, are simplified flowchart illustrations of methods for computerized identification and presentation of semantic themes occurring in a set of electronic documents, including performing topic modeling on the set of documents thereby to yield a set of topics and for each topic, a topic-modeling output list of words; and using a processor performing a matching algorithm to match only a subset of each topic-modeling output list of words, to the output list's corresponding topic, such that each word appears in no more than a predetermined number of subsets from among said subsets.

FIG. 3a is a simplified flowchart illustration of an initialization method useful for performing step 100 in the method of FIG. 2.

FIG. 3b is a simplified flowchart illustration of an initialization method useful for performing step 220 in the method of FIG. 2.

FIGS. 8-9 are simplified flowchart illustrations of methods useful herein.

Figure 1A:
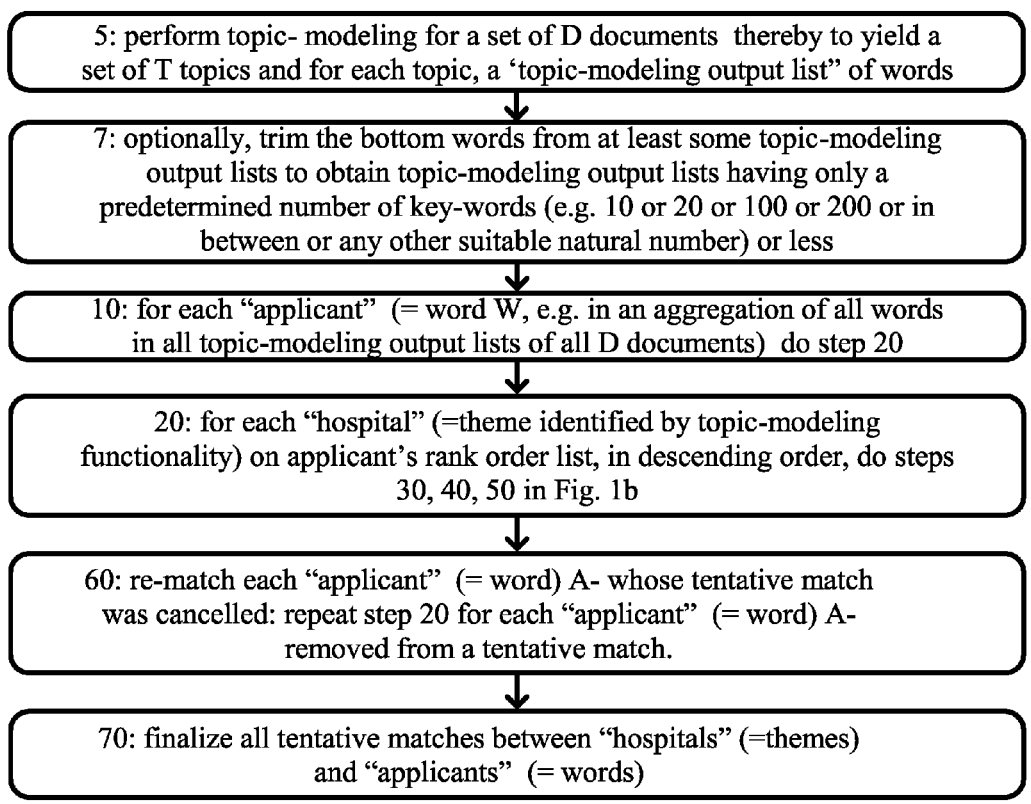

The methods of FIGS. 1-4, 8-9 each include some or all of the illustrated steps, suitably ordered e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

A method is provided herein for computerized identification and presentation of semantic themes in a set of documents, the method comprising performing topic modeling on the set of documents thereby to yield a set of topics and for each topic, a topic-modeling output list of words; and using a processor performing a matching algorithm, such as a hospital-residents matching algorithm, to match only a subset of each topic-modeling output list of words, to the output list's corresponding topic, such that each word appears in no more than a predetermined number of subsets from among said subsets. In the algorithm, each topic's output list of words is used to indicate "hospital" (topic) preferences for "residents" (words).

According to Wikipedia, the problem of matching hospitals to residents is a generalization of the stable marriage problem where "stability means that there is no applicant A and hospital H such that 1. A is unmatched or would prefer to go to H over the hospital he is currently matched with; and
2. H has a free slot for an applicant, or would prefer A over one of the candidates currently filling one of its slots."

Solutions to the problem of computerized matching of hospitals to residents include the Gale-Shapley computerized matching process.

FIGS. 1a-1b, taken together, is a simplified flowchart illustration for computerized identification of a topic name (comprising a set of 1 or more words), for each of several or many topics identified in a set of documents, all according to a first embodiment of the present invention. The method of FIG. 1a may include any subset of the following steps, in any suitable order such as the following:

5: perform topic-modeling for a set of D documents thereby to yield a set of T topics and for each topic, a "topic-modeling output list" of words

7: optionally, trim the bottom words from at least some topic-modeling output lists to obtain topic-modeling output lists having only a predetermined number of key-words (e.g. 10 or 20 or 100 or 200 or in between or any other suitable natural number) or less

10: for each "applicant" (=word W, e.g. in an aggregation of all words in all topic-modeling output lists of all D documents) do step 20

20: for each "hospital" (=theme identified by topic-modeling functionality) on applicant's rank order list, in descending order, do steps 30, 40, 50 in FIG. 1b

60: re-match each "applicant" (=word) A—whose tentative match was cancelled: repeat step 20 for each "applicant" (=word) A—removed from a tentative match.

70: finalize all tentative matches between "hospitals" (=themes) and "applicants" (=words).

The method of FIG. 1a may include any subset of the following steps, in any suitable order such as the following:

30: check does the "hospital" (=theme) have an unfilled position (does the "hospital" (=theme) have less than 5 (say) words in its theme-name)?
40: If yes, tentatively match "applicant" (=word) to "hospital" (=theme) (optional: only if "hospital" (=theme) list has indicated that "applicant" (=word) is acceptable) and continue to next "applicant" (=word) (i.e. back to step 10)
50: if not (if the "hospital" (=theme) does not have an unfilled position), is the "applicant" (=word) is more preferred by the "hospital" (=theme) than another "applicant" (=word) A—who already is tentatively matched to the "hospital" (=theme)? If yes, cancel the tentative match between the "hospital" (=theme) and "applicant" (=word) A—, tentatively match "applicant" (=word) A to "hospital" (=theme) and continue to next "applicant" (=word) (i.e. back to step 10). If not, continue to next "hospital" (=theme) (i.e. back to step 20)
(In case applicant A gets no tentative match and all the applicant's choices on the ROL are exhausted, omit that topic)

Regarding step 5 (perform topic-modeling) and similarly for topic-modeling steps in other methods herein:

A topic model is a computational functionality analyzing a set of documents and yielding "topics" that occur in the set of documents typically including (a) what the topics are and (b) what each document's balance of topics is. According to Wikipedia, "Intuitively, given that a document is about a particular topic, one would expect particular words to appear in the document more or less frequently: "dog" and "bone" will appear more often in documents about dogs, "cat" and "meow" will appear in documents about cats, and "the" and "is" will appear equally in both. A document typically concerns multiple topics in different proportions". Topic models may analyze large volumes of unlabeled text and each "topic" may consist of a cluster of words that occur together frequently.

Another definition, from the following http location:
faculty.washington.edu/jwilker/559/SteyversGriffiths.pdf, is that topic modeling functionality proceeds from an assumption "that documents are mixtures of topics, where a topic is a probability distribution over words. A topic model is a generative model for documents: it specifies a simple probabilistic procedure by which documents can be generated. To make a new document, one chooses a distribution over topics. Then, for each word in that document, one chooses a topic at random according to this distribution, and draws a word from that topic. Standard statistical techniques can be used to invert this process, inferring the set of topics that were responsible for generating a collection of documents."

Topic modeling as used herein includes any or all of the above, as well as any computerized functionality which inputs text/s and uses a processor to generate and output a list of semantic topics which the text/s are assumed to pertain to, wherein each "topic" comprises a list of keywords assumed to represent a semantic concept.

Topic modeling includes but is not limited to any and all of: the Topic modeling functionality described by Papadimitriou, Raghavan, Tamaki and Vempala in 1998; Probabilistic latent semantic indexing (PLSI), created by Thomas Hofmann in 1999; Latent Dirichlet allocation (LDA), developed by David Blei, Andrew Ng, and Michael I. Jordan in 2002 and allowing documents to have a mixture of topics; extensions on LDA, such as but not limited to Pachinko allocation;

Griffiths & Steyvers Topic modeling e.g. as published in 2002, 2003, 2004; Hofmann Topic modeling e.g. as published in 1999, 2001; topic modeling using the synchronic approach; topic modeling using the diachronic approach; Topic modeling functionality which attempts to fit appropriate model parameters to the data corpus using heuristic/s for maximum likelihood fit, topic modeling functionality with provable guarantees; topic modeling functionality which uses singular value decomposition (SVD), topic modeling functionality which uses the method of moments, topic modeling functionality which uses an algorithm based upon non-negative matrix factorization (NMF); and topic modeling functionality which allows correlations among topics. Topic modeling implementations may for example employ Mallet (software project), Stanford Topic Modeling Toolkit, or GenSim—Topic Modeling for Humans.

Figure 2B:
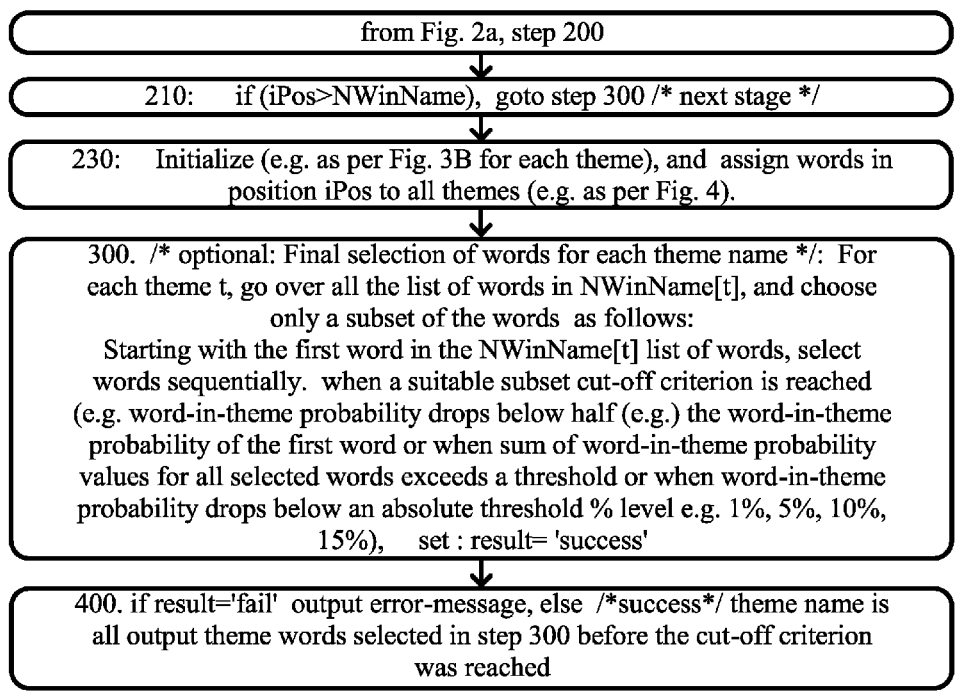

FIGS. 2*a*-2*b*, taken together, is a simplified flowchart illustration for computerized identification of a topic name (comprising a set of 1 or more words), for each of several or many topics identified in a set of documents, all according to a second embodiment of the present invention. The method of FIGS. 2*a*-2*b*, taken together, may include all of or any subset of the following steps, in any suitable order such as the following:

80: Input NWinName /* NWinName=maximum number of words that will appear in a theme name. default may for example be 5, or any other integer between 1 and 10*/
90. Set: NWinTheme=Min(Max(2*NWinName,20), vocabularySizeInThemeAlgorithm) /* NWinTheme=maximum number of words from each theme, to be used for this process. vocabularySizeInThemeAlgorithm=Number of distinct words appearing in all documents used for automated theme generation
100: If (NWinTheme>vocabularySizeInThemeAlgorithm), set result='fail' and goto step 400
101. Initialize (e.g. as per FIG. 3A for each theme):
create an empty ThemeWordsInName list; and
insert, to ThemeWordsList, the top NWinTheme words along with their respective word-in-theme probabilities. The words in the list are ordered by their respective probability, from highest to lowest;
200: Set iPos=1=position of word in all theme names. The ThemeWordsInName lists, for each theme, are now (in the loop starting here at step 200) filled with words assigned to each theme's name.
210: if (iPos>NWinName), goto step 300/* next stage */
230: Initialize (e.g. as per FIG. 3B for each theme), and assign words in position iPos to all themes (e.g. as per FIG. 4).
300. /* optional: Final selection of words for each theme name */: For each theme t, go over all the list of words in NWinName[t], and choose only a subset of the words as follows: Starting with the first word in the NWinName[t] list of words, select words sequentially. when a suitable subset cut-off criterion is reached (e.g. word-in-theme probability drops below half (e.g.) the word-in-theme probability of the first word or when sum of word-in-theme probability values for all selected words exceeds a threshold or when word-in-theme probability drops below an absolute threshold % level e.g. 1%, 5%, 10%, 15%), set: result='success'
400. if result='fail' output error-message, else /*success*/ theme name is all output theme words selected in step 300 before the cut-off criterion was reached It is appreciated that steps from FIGS. 1*a*-1*b*, taken together, may be combined with steps from FIGS. 2*a*-2*b*, taken together, in any suitable manner. Typically, the method of FIGS. 1*a*-1*b*, taken together, performs topic modeling on the set of documents thereby to yield a set of topics which may be deemed to represent semantic themes respectively, and for each topic, a topic-modeling output list of words; and uses a processor for performing a matching algorithm to match only a subset of each topic-modeling output list of words, to the output list's corresponding topic, such that each word appears in no more than a predetermined number of subsets, such as but not limited to 1, from among said subsets. It is appreciated that the method of FIG. 2 may be modified such that each word appears in no more than a predetermined number N>1 of subsets, rather than in one single subset.

FIG. 3a is a simplified flowchart illustration of an initialization method useful for performing step 100 in the method of FIG. 2 and may include some or all of the following, suitably ordered e.g. as shown:

102: For each theme t, create a list ThemeWordsList[t]: a list of NWinTheme words, ordered by word-in-theme probability generated by topic modeling process, from high to low. Each theme t will choose the words that are to appear in its name from its own list of words, ThemeWordsList[t].

103: For each theme t, create a list ThemeWordsInName[t], storing words that are to appear in the theme name. Initially all ThemeWordsInName[t] lists are empty.

104: Set DistinctWordsList: a list of all distinct words that appear in all ThemeWordsList's.

FIG. 3b is a simplified flowchart illustration of an initialization method useful for performing step 220 in the method of FIG. 2, and may include some or all of the following, suitably ordered e.g. as shown:

222: For each theme t, create a new list—ThemeWordsCandidates[t]. The list will contain all the words the theme will try to assign to itself for the current word position.

223: Set that all words in DistinctWordsList are not candidates of any theme.

Figure 4:
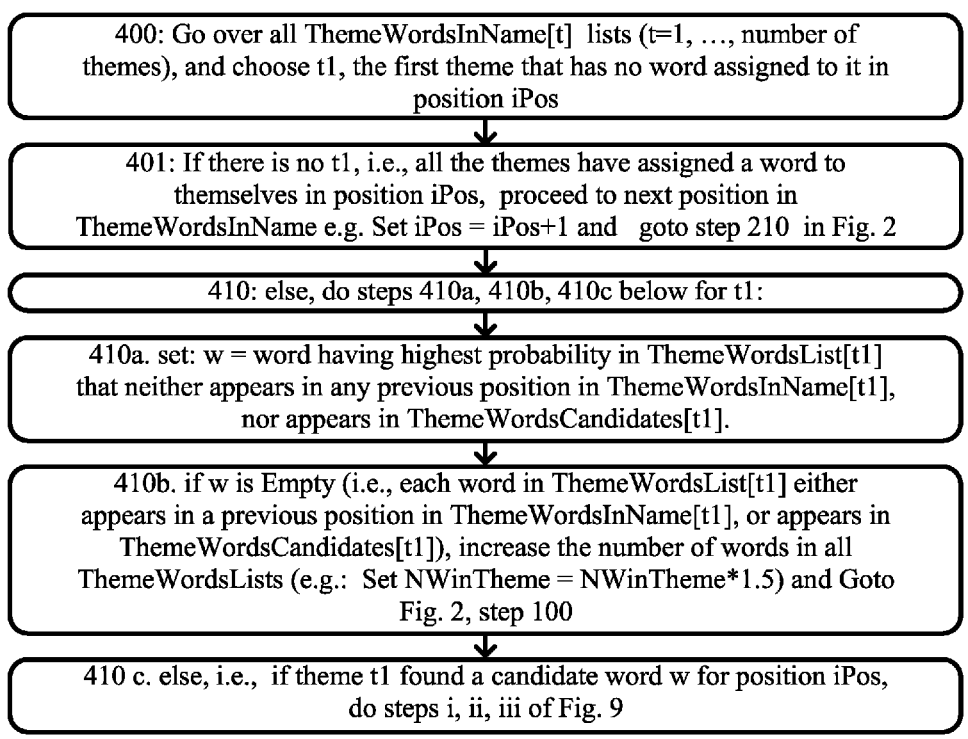
FIG. 4 is a simplified flowchart illustration of a theme processing method useful for performing step 230 in the method of FIG. 2.

FIG. 4 is a simplified flowchart illustration of a theme processing method useful for performing step 230 in the method of FIG. 2, and may include some or all of the following, suitably ordered e.g. as shown:

400: Go over all ThemeWordsInName[t] lists (t=1, . . . , number of themes), and choose t1, the first theme that has no word assigned to it in position iPos 401: If there is no t1, i.e., all the themes have assigned a word to themselves in position iPos, proceed to next position in ThemeWordsInName e.g. Set iPos=iPos+1 and goto step 210 in FIG. 2

410: else, do steps 410a, 410b, 410c below for t1:

410a. set: w=word having highest probability in ThemeWordsList[t1] that neither appears in any previous position in ThemeWordsInName[t1], nor appears in ThemeWordsCandidates[t1].

410b. if w is Empty (i.e., each word in ThemeWordsList[t1] either appears in a previous position in ThemeWordsInName [t1], or appears in ThemeWordsCandidates[t1]), increase the number of words in all ThemeWordsLists (e.g.: Set NWinTheme=NWinTheme*1.5) and Goto FIG. 2, step 100

Figure 9:
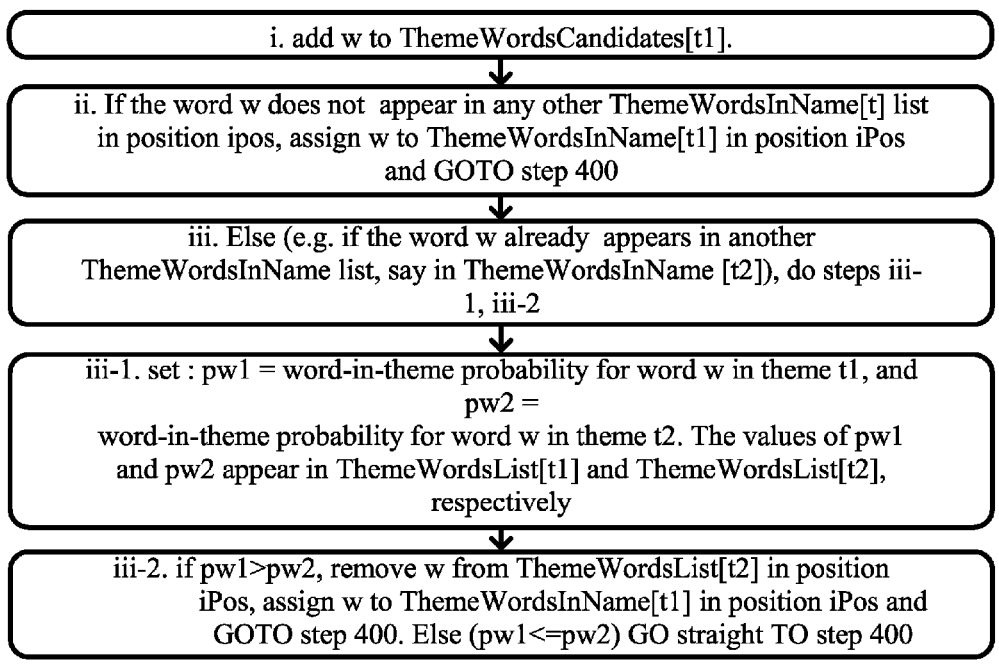

410c. else, i.e., if theme t1 found a candidate word w for position iPos, do steps i, ii, iii of FIG. 9.

Figure 5:
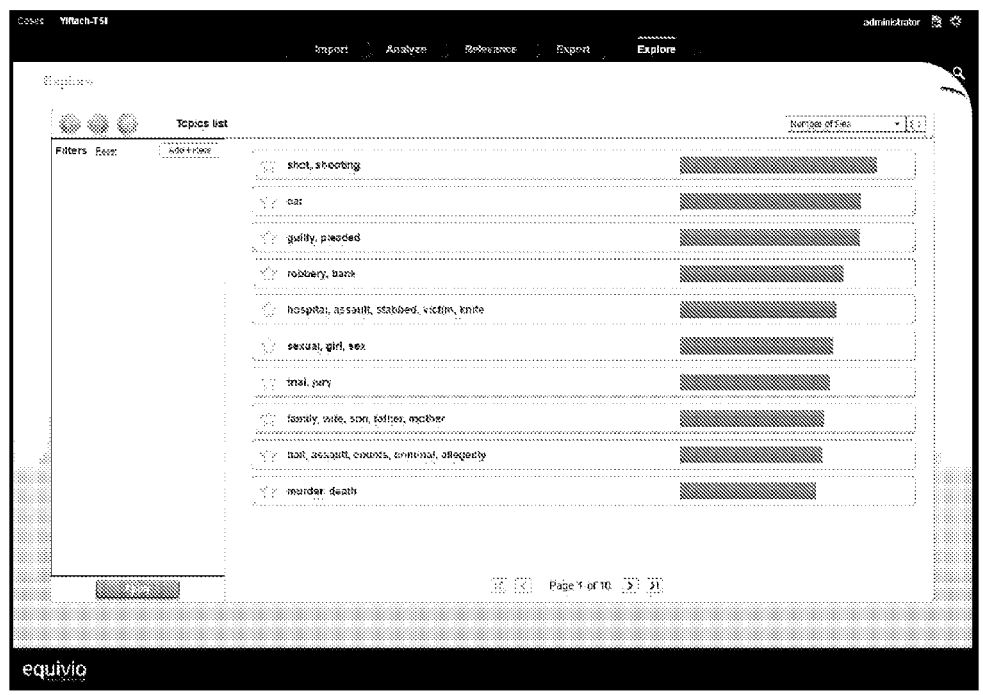
FIGS. 5-7 are examples of simplified screenshot illustrations useful in accordance with certain embodiments.

FIG. 5 is a simplified screenshot illustration of an example display screen generated by a system constructed and operative in accordance with certain embodiments. As shown, each theme is presented together with a bar (right side of screen) indicating relevance to a user-selected issue. As shown, order of presentation of the screens is in accordance with length of the bar. The screen display facilitates theme-level browsing, according to certain embodiments. For example, the bars may indicate the number of files per theme, that are Relevant (e.g. as determined manually, or automatically e.g. by Equivio Zoom's Relevance functionality) to a user-selected issue which may if desired be shown on, and selected via, a suitable GUI (not shown).

Figure 6:
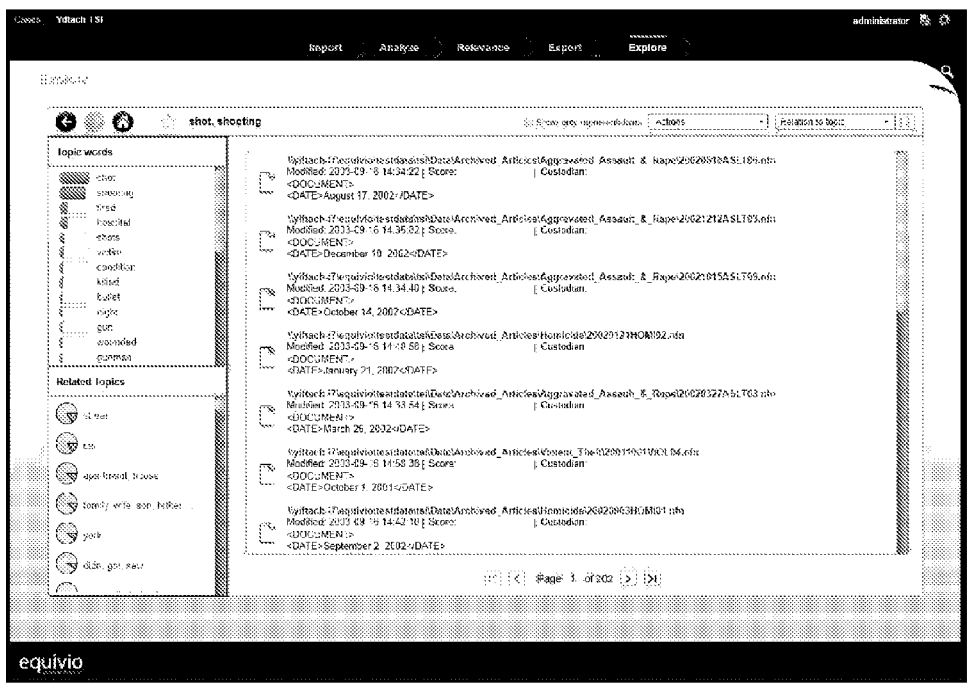

FIG. 6 is a simplified screenshot illustration of an example display screen generated by a system constructed and operative in accordance with certain embodiments. As shown, documents are presented along with (on the left) words in the documents and their word scores, relative to an individual theme, as well as themes related to the individual theme. The words and themes may be presented in descending order of their word scores and relatedness to the individual theme, respectively. If a related theme or word is selected (e.g. clicked upon), a different "semantic view" is generated; for example, of all documents in the selected related theme, using a screen format which may be similar to that of FIG. 6. As shown, flitting from document-level to theme-level or word-level is facilitated.

Figure 7:
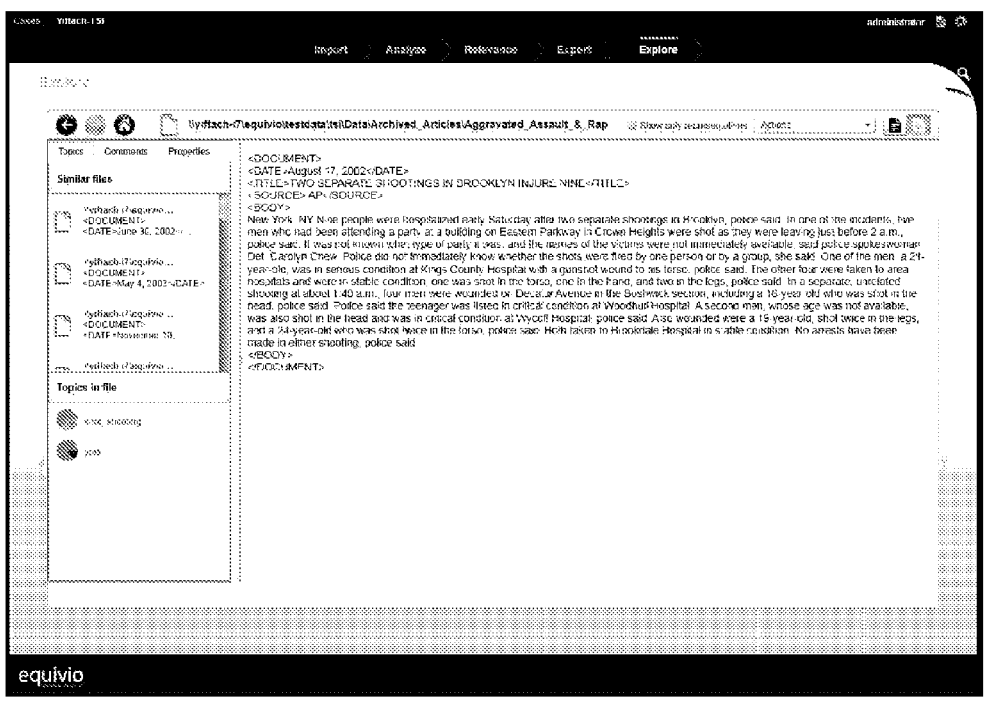

FIG. 7 is a simplified screenshot illustration of an example display screen generated by a system constructed and operative in accordance with certain embodiments. As shown, document-level browsing is facilitated.

FIG. 8 may include some or all of the following, suitably ordered e.g. as shown:

801. Put the first top N (where N is a shorthand notation for the parameter NWinName described in FIG. 2) words from ThemeWordsList, into ThemeWordsInName.

802. If any word appears in more than one ThemeWordsInName, discard that word from those themes' lists, and replace it with another word e.g. insert into the Nth position the word that is in the N+1'th position in the respective ThemeWordsList lists. Alternatively, retain the repeating word only in one ThemeWordsInName list e.g. the list corresponding to the theme whose word-in-theme probability for the repeating word is the highest, and in the remaining lists discard the repeating word and replace with another word e.g. insert into the Nth position the word that is in the N+1'th position in the respective ThemeWordsList lists.

803. Again go over all ThemeWordsInName lists. If there is still a word that appears in more than one list, discard that word from those lists (or from all but one of those lists, e.g. all but the list where the word-in-theme probability for the repeating word is the highest), and insert in the last position in those lists (or in those lists other than the one where the word-in-theme probability for the repeating word is the highest) the next from the top word, from the respective ThemeWordsList, that was not yet inserted in ThemeWordsInName.

804. Continue similarly, until:

the words in all ThemeWordsInName lists are distinct from one other; or until the words in ThemeWordsInName lists appear exactly once across all ThemeWordsInName lists. FIG. 9 may include some or all of the following, suitably ordered e.g. as shown:

i. add w to ThemeWordsCandidates[t1].

ii. If the word w does not appear in any other ThemeWordsInName[t] list in position ipos, assign w to ThemeWordsInName[t1] in position iPos and GOTO step 400 iii. Else (e.g. if the word w already appears in another ThemeWordsInName list, say in ThemeWordsInName [t2]), do steps iii-1, iii-2 iii-1. set: pw1=word-in-theme probability for word w in theme t1, and pw2=word-in-theme probability for word w in theme t2. The values of pw1 and pw2 appear in ThemeWordsList[t1] and ThemeWordsList[t2], respectively iii-2. if pw1>pw2, remove w from ThemeWordsList[t2] in position iPos, assign w to ThemeWordsInName[t1] in position iPos and GOTO step 400. Else (pw1<=pw2) GO straight TO step 400.

Earlier presented embodiments are now described for use either independently or in suitable combination with the embodiments described above:

When enhancing expert-based computerized analysis of a set of digital documents, a system for computerized derivation of leads from a huge body of data may be provided, the system comprising:

an electronic repository including a multiplicity of accesses to a respective multiplicity of electronic documents and metadata including metadata parameters having metadata values characterizing each of said multiplicity of electronic documents;

a relevance rater using a processor to run a first computer algorithm on said multiplicity of electronic documents which yields a relevance score which rates relevance of each of said multiplicity of electronic documents to an issue; and a metadata-based relevant-irrelevant document discriminator using a processor to rapidly run a second computer algorithm on at least some of said metadata which yields leads, each lead comprising at least one metadata value for at least one metadata parameter, which value correlates with relevance of said electronic documents to the issue.

The application is operative to find outliers of a given metadata and relevancy score (i.e. relevant, not relevant). When theme-exploring is used, the system can identify themes with high relevancy score based on the given application. The above system, without theme-exploring, may compute the outlier for a given metadata, and each document appears one in each metadata. In the theme-exploring settings for a given set of themes the same document might fall into several of the metadata.

Method for Use of Themes in e-Discovery:
step i. Input: a set of electronic documents. The documents could be in:
Text format, Native files (PDF, Word, PPT, etc.), ZIP files, PST, Lotus notes, MSG, etc.
Step ii Extract text from the data collection. Text extraction can be done by third party software such as: Oracle inside out, iSys, DTSearch, iFilter, etc.
Step iii: Compute Near-duplicate (ND) on the dataset.
The following teachings may be used: U.S. Pat. No. 8,015,124, entitled "A Method for Determining Near Duplicate Data Objects"; and/or WO 2007/086059, entitled "Determining Near Duplicate "Noisy" Data Objects", and/or suitable functionalities in commercially available e-discovery systems such as those of Equivio.
For each document compute the following:
Step iiia: DuplicateSubsetID: all documents having the same DuplicateSubsetID having an identical text.
Step iiib: EquiSetID: all documents having the same EquiSetID are similar (for each document x in the set there is another document y in the set, such that the similarity between the two is greater than some threshold).
Step iiic: Pivot: 1 if the document is a representative of the set (and 0 otherwise). Typically, for each EquiSet only one document is selected as Pivot. The pivot document can be selected by a policy for example (maximum words number of words, minimum number of words, median number of words, minimum docid, etc.) When using theme networking (TN) it is recommended to use maximum words in documents as pivot policy as it is desirable for largest documents to be in the model.
Step iv. Compute Email threads (ET) on the dataset. The following teachings may be used: WO 2009/004324, entitled "A Method for Organizing Large Numbers of Documents" and/or suitable functionalities in commercially available e-discovery systems such as those of Equivio.
The output of this phase is a collection of trees, and all leafs of the trees are marked as inclusive. Note, that family information is accepted (to group e-mails with their attachments).
Step v. Run a topic modeling algorithm (such as LDA) on a subset of the dataset, including feature extraction. Resulting topics are defined as themes. The subset includes the following documents:
Inclusive from Email threads (ET)
Pivots from all documents that are not e-mails. i.e. pivots from documents and attachments.
The data collection include less files (usually the size is 50% of the total size); and the data do not include similar documents, therefore if a document appears many times in the original data collection it will have the same weight as if it appears once.

In building the model documents were used with more than 25 (parameter) words and less than 20,000 words. The idea behind this limitation was to improve performance, and not be influenced by high words frequency when the document has few features.

If the dataset is extremely large, at most 100,000 (parameter) documents may be selected at random to build the model, and after building the model, it may be applied on all other documents.

The first step in the topic modeling algorithm is to extract features from each document.

A method suitable for the Feature extraction of step v may include obtaining features as follows:

A topic modeling algorithm uses features to create the model for the topic-modeling step v above. The features are words; to generate a list of words from each word one may do the following:

If the document is an e-mail, remove all e-mail headers in the document, but keep the subject line and the body. One may multiply the subject line to set some weight to the subject words.
Tokenize the text using separators such as, spaces, semicolon, colon, tabs, new line etc.
Ignore the following features:
Words with length less than 3 (parameter)
Words with length greater than 20 (parameter)
Words that do not start with an alpha character.
(Optionally)—words that contain digits
Words that contain non-AlphaNumeric characters, excluding (parameter) a subset of non-AlphaNumeric characters such as '_'. For example, the features a@b and a:b are not allowed, but the feature a_b is allowed.
Words that are stop words.
Words that appear more than 0.2 times number of words in the document. (parameter)
Words that appear in less than 0.01 times number of documents. (Parameter)
Words that appear in more than 0.2 times number of documents. (Parameter)
Stemming, part-of-speech—as features.
Step viii. Theme names. The output of step v includes an assignment of documents to the themes, and an assignment of words (features) to themes. Each feature x has some probability P_xy of being in theme y. Using the P matrix, construct names to the themes.

In e-discovery one may use the following scenarios: Early Case Assessment, Post Case Assessment and provision of helpful User Interfaces.

Early Case Assessment (some or all of the following steps a-h):
a. Select at random 100000 documents
b. Run near-duplicates (ND)
c. Run Email threads (ET)
d. Select pivot and inclusive
e. Run topic modeling using the above feature selection. The input of the topic modeling is a set of documents. The first phase of the topic modeling is to construct a set of features for each document. The feature getting method described above may be used to construct the set of features.
f. Run the model on all other documents (optional).
g. Generate theme names e.g. using step viii above.
h. Explore the data by browsing themes; one may open a list of documents belonging to a certain theme, from the document one may see all themes connected to that document (excluding themes having theme-in_document probability below some [parameter] threshold), and go to other themes.

The list of documents might be filtered by a condition set by the user. For example filter all documents by dates, relevancy, file size, etc.

The above procedure assists users in early case assessment when the data is known and one would like to know what is in the data, and assess the contents of the data collection.

In early case assessment one may randomly sample the dataset to get results faster.

Post Case Assessment This process uses some or all of steps I-v above, but in this setting an entire dataset is not used, but rather, only the documents that are relevant to the case. If near-duplicates (ND) and Email threads (ET) have already run, there is no need to re-run them.

$1^{st}$ pass review is a quick review of the documents that can be handled manually or by an automatic predictive coding software; the user wishes to review the results and get an idea on the themes of the documents that passed that review. This phase is essential because the number of such documents might be extremely large. Also, there are cases in which, in some sub-issues, there are only a few documents.

The above building block can generate a procedure for such cases. Here, g only documents that passed the $1^{st}$ review phase are taken, and themes are calculated for them. User Interface using the output of steps I-v and displaying results thereof.

Upon running the topic modeling each resulting topic is defined as a theme, and for each theme the list of documents is displayed that are related to that theme. The user has an option to select a meta-data (for example is the document relevant to an issue, custodian, date-range, file type, etc.) and the system will display for each theme the percentage of meta-data in that theme. Such presentation would assist the user while evaluating the theme.

An LDA model might have themes that can be classified as CAT_related and DOG_related. A theme has probabilities of generating various words, such as milk, meow, and kitten, which can be classified and interpreted by the viewer as "CAT_related". The word cat itself will have high probability given this theme. The DOG_related theme likewise has probabilities of generating each word: puppy, bark, and bone might have high probability. Words without special relevance, such as the (see function word), will have roughly even probability between classes (or can be placed into a separate category). A theme is not strongly defined, neither semantically nor epistemologically. It is identified on the basis of supervised labeling and (manual) pruning on the basis of their likelihood of co-occurrence. A lexical word may occur in several themes with a different probability, however, with a different typical set of neighboring words in each theme.

Each document is assumed to be characterized by a particular set of themes. This is akin to the standard bag of words model assumption, and makes the individual words exchangeable.

Processing a large data set requires time and space, in the context of the current invention N documents are selected to create the model, and then the model is applied on the remaining documents.

When selecting the documents to build the model, a few options may be possible:
O1. Take all documents.
O2. Take one documents for each set of exact duplicate documents
O3. Take one documents from each EquiSet (e.g. as per U.S. Pat. No. 8,015,124, entitled "A Method for Determining Near Duplicate Data Objects"; and/or WO 2007/086059, entitled "Determining Near Duplicate "Noisy" Data Objects").
O4. Take the inclusive from the data collection. Another option is to randomly sample X documents from the collection, as described above.

Steps O2, O3, O4 aim to create themes that are known to the user, and also not to weight documents that already appear in a known set.

The input for the algorithm is a text documents that can be parsed to a bag-of-words. When processing an e-mail, one may notice that the e-mail contains a header (From, to, CC, Subject); and a body. The body of an e-mail can be a formed by a series of e-mails.

For example:
From: A
To: B
Subject: CCCCC
Body1 Body1
  From: B
  To: A
  Subject: CCCCC
  Body2 Body2

While processing e-mails for topic modeling one can consider removing all e-mail headers within the body, and by setting a weight to the subject by using a multiple subject line. In the above example the processed text would be:
CCCCC
CCCCC
CCCCC
Body1 Body1
Body2 Body2

Step viii (Theme names) is now described in detail:

Let $P(w\_i, t\_j)$ the probability that the feature w_i belongs to theme t_j. In known implementations the theme name is a list of words with the highest probability. The solution is good when the dataset is sparse, i.e. the vocabulary of the themes is different from each other. In e-discovery the issues are highly connected and therefore, there are cases when the "top" words appeared in two or more themes. In settings of the problem "stable marriage" was used as in an algorithm, to pair words to themes. The algorithm may include:

Order the theme by some criteria (Size, Quality, # of relevant documents, etc.); i.e. theme_3 is better than theme_4.

(1) Create an empty set S
(2) Sort themes by some criteria
(3) For j=0; j<maximum words in theme name; j++
(4) For I=0; I<#number of themes; i++) do
(5) For theme_i, assign the word with the highest score that is not in S, and add that word to S After X words are assigned for each theme, the number of words can be reduced by, for example, taking only those words in each theme that are bigger than the maximum word rank in that theme, divided by some constant.

A particular advantage of certain embodiments is that the list of words provided by the computerized functionality described herein, is far more user friendly when used to identify semantic themes corresponding respectively to topics identified by topic modeling, than the lists of keywords provided by conventional topic modeling. For example, Wikipedia on Latent Dirichlet Allocation (LDA) states (emphasis added) that "LDA is . . . an example of a topic model and . . . an LDA model might have topics that can be classified as CAT_related and DOG_related. A topic has probabilities of generating various words, such as milk, meow, and kitten, which can be classified and interpreted by the viewer as "CAT_related". Naturally, the word cat itself will have high probability given this topic. The DOG_related topic likewise has probabilities of generating each word: puppy, bark, and bone might have high probability . . . . A topic is not strongly defined, neither semantically nor epistemologically . . . . A lexical word may occur in several topics . . . .

So, in conventional topic modeling, there is an unproved assumption that what one might term the "real name" of each topic (e.g. CAT and DOG above), "will have high probability" and hence, presumably, will be easily identifiable by the user. Experience shows that this is not the case, either because the keywords identifying a topic or theme do not include a "real name" of each topic at all, or because the user has difficulty in identifying which of the several keywords identifying a topic, is the "real name" thereof. Therefore, users find it difficult to use the topics for semantic processing. One factor which greatly contributes to a user's confusion and difficulty in keeping topics straight, is the fact that "A lexical word may occur in several topics". A particular advantage of certain embodiments herein is that any individual keyword is used to characterize only one topic; if a keyword occurs in several topics generated by a topic modeling functionality, it is replaced in at least all but one of these topics.

Typically, electronic documents do not bear, or do not need to bear, any pre-annotation or labeling or meta-data, or if they do, such is not employed by the topic modeling which instead is derived by analyzing the actual texts.

A particular advantage of certain embodiments of the invention is that collections of electronic documents are hereby analyzed semantically by a processor on a scale that would be impossible manually. Output of topic modeling may include the n most frequent words from the m most frequent topics found in an individual document.

Regarding e.g. FIGS. 2a-2b, taken together, note that "word-in-theme" probability is the probability that a topic, generated by topic-modelling, will generate an individual word. For example, the topic "dog" has a high probability of generating words like puppy, bark, and bone e.g. as described in en.wikipedia.org/wiki/Latent_Dirichlet_allocation) Wikipedia's entry on LDA). Commercially available LDA topic-modelling software generates these probabilities automatically or the probabilities may be generated using suitable computations given the statistical assumptions of the topic-modelling process used in automated generation of themes.

It is appreciated that many variations on the method of FIGS. 2a-2b, taken together, are possible. For example, step 300, which allows some theme names to be shorter than others (e.g. some themes may have names which include only 2 words which well span the subject matter of the theme, whereas other themes have names which include, say, 5 words) may be omitted. Instead, all themes may be required to include 5 words. Also, instead of generating NWinName[t] lists and truncating them, initial NWinName[t] lists may be generated, of a predetermined length (number of words), and some of these may be expanded in length if a suitable subset expansion criterion is satisfied (e.g. word-in-theme probabilities for all words in a initial NWinName[t] list are all relatively high, or sum of word-in-theme probability values for all selected words fall below a threshold).

Also, instead of using the method of FIG. 4 to effect FIGS. 2a-2b, taken together, 230, any other suitable method may be employed e.g. the method of FIG. 8.

The methods shown and described herein are particularly useful in processing or analyzing or sorting or searching bodies of knowledge including hundreds, thousands, tens of thousands, or hundreds of thousands of electronic documents or other computerized information repositories, some or many of which are themselves at least tens or hundreds or even thousands of pages long. This is because practically speaking, such large bodies of knowledge can only be processed, analyzed, sorted, or searched using computerized technology.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present invention, inter alia, are electromagnetic signals carrying computer-readable instructions for performing any or all of the steps or operations of any of the methods shown and described herein, in any suitable order including simultaneous performance of suitable groups of steps as appropriate; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; a processor configured to perform any combination of the described steps or to execute any combination of the described modules; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunication equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A method for computerized identification and presentation of semantic themes occurring in a set of electronic documents, the method comprising:

generating one or more topics by performing topic modeling on the set of electronic documents;

outputting, using the topic modeling, a plurality of ordered lists of words, individual ones of the plurality of ordered lists of words corresponding to individual ones of the one or more topics, the ordered lists of words being arranged from top to bottom corresponding to highest to lowest probability in relation to the one or more topics;

determining a first unused theme name from a first list of the plurality of ordered lists of words, wherein the determining the first unused theme name is a first iterative process based on identifying a first unused word that is not on an already-used list starting from a top of the first list and moving toward a bottom of the first list;

adding the first unused theme name to the already-used list;

determining a second unused theme name from a second list of the plurality of ordered lists of words, wherein the determining the second unused theme name is a second iterative process based on identifying a second unused word that is not on the already-used list starting from a top of the second list and moving toward a bottom of the second list;

adding the second unused theme name to the already-used list;

removing, for the individual ones of the plurality of ordered lists of words, one or more words at a bottom of an ordered list of words thereby providing a plurality of ordered lists of top keywords corresponding to individual ones of the one or more topics, wherein individual ones of the plurality of ordered lists of top keywords have up to a predetermined number of top keywords; and applying a matching algorithm to the plurality of ordered lists of top keywords to produce a plurality of reduced lists of keywords, individual ones of the plurality of reduced lists of keywords (i) including a subset of keywords of the individual ones of the plurality of ordered lists of top keywords and (ii) corresponding to the individual ones of the plurality of ordered lists of top keywords, such that a keyword from the plurality of ordered lists of top keywords appears in no more than a predetermined number of reduced lists of keywords of the plurality of reduced lists of keywords.

2. The method according to claim 1 wherein matching algorithm comprises a hospital-residents matching algorithm and the individual ones of the plurality of ordered lists of top keywords are used to indicate topic preferences for keywords.

3. The method according to claim 2 wherein the hospital-residents matching algorithm assumes the keywords have no preference between the one or more topics.

4. The method according to claim 1 wherein the predetermined number of reduced lists of keywords is one.

5. The method according to claim 1 wherein the topic modeling comprises Latent Dirichlet Allocation (LDA)-type topic modeling.

6. The method according to claim 1 wherein the subset of keywords includes at most a predetermined maximum number of keywords.

7. The method according to claim 6 wherein the subset of keywords includes a predetermined number of keywords.

8. The method according to claim 6 wherein the subset of keywords includes less than the predetermined maximum number of keywords based at least in part on a predetermined computational criterion establishing theme name quality sufficiency being satisfied.

9. The method according to claim 1 wherein the one or more topics correspond to one or more themes, the method further comprising displaying the plurality of reduced lists of keywords as theme names for the one or more themes.

10. The method according to claim 1 wherein the ordered list of words comprises a predetermined number of keywords following removal of the one or more words at a bottom of the ordered list of words.

11. A computer program product comprising a non-transitory tangible computer readable medium having computer readable program code embodied therein, the computer readable program code adapted to be executed to implement a method comprising:
generating one or more topics by performing topic modeling on a set of electronic documents;
outputting, using the topic modeling, one or more ordered lists of words, individual ordered lists of the one or more ordered lists of words corresponding to individual topics of the one or more topics, the one or more ordered lists of words being arranged from top to bottom corresponding to highest to lowest probability in relation to the one or more topics;
determining theme names for the individual ordered lists of the one or more ordered lists of words corresponding to individual topics of the one or more topics, wherein an individual theme name is determined for a corresponding list of the individual ordered lists based on an iterative process of identifying a first unused word that is not on an already-used list starting from a top of the corresponding list of the individual ordered lists and moving toward a bottom of the corresponding list of the individual ordered lists, and adding the individual theme name to the already-used list;
removing, for the individual ordered lists of the one or more ordered lists of words, one or more words at a bottom of an ordered list of words thereby providing one or more ordered lists of top keywords corresponding to individual topics of the one or more topics, wherein individual ones of the one or more ordered lists of top keywords have up to a predetermined number of top keywords; and
applying a matching algorithm to the one or more ordered lists of top keywords, resulting in one or more reduced lists of keywords, individual reduced lists of the one or more reduced lists of keywords (i) including a subset of keywords of the individual ordered lists of the one or more ordered lists of top keywords, and (ii) corresponding to the individual ordered lists of the one or more ordered lists of top keywords, such that a keyword included in the one or more ordered lists of top keywords appears in no more than a predetermined number of reduced lists of keywords of the one or more reduced lists of keywords.

12. A system for computerized identification and presentation of semantic themes occurring in a set of electronic documents, the system comprising:
one or more processors; and
memory coupled to the one or more processors, the memory storing computer-executable instructions that, when executed, cause the one or more processors to:
generate one or more topics by performing topic modeling on the set of electronic documents;
output, using the topic modeling, a plurality of ordered lists of words, individual ones of the plurality of ordered lists of words corresponding to individual ones of the one or more topics, the ordered lists of words being arranged from top to bottom corresponding to highest to lowest probability in relation to the one or more topics;
determine a first unused theme name from a first list of the plurality of ordered lists of words, wherein the first unused theme name is determined based at least in part on a first iterative process identifying a first unused word that is not on an already-used list starting from a top of the first list and moving toward a bottom of the first list;
add the first unused theme name to the already-used list;
determine a second unused theme name from a second list of the plurality of ordered lists of words, wherein the second unused theme name is determined based at least in part on a second iterative process identifying a second unused word that is not on the already-used list starting from a top of moving toward a bottom of the second list;
add the second unused theme name to the already-used list;
remove, for the individual ones of the plurality of ordered lists of words, one or more words at a bottom of an ordered list of words thereby providing a plurality of ordered lists of top keywords corresponding to individual ones of the one or more topics, wherein individual ones of the plurality of ordered lists of top keywords have up to a predetermined number of top keywords; and
apply a matching algorithm to the plurality of ordered lists of top keywords to produce a plurality of reduced lists of keywords, individual ones of the plurality of reduced lists of keywords including a subset of keywords of the individual ones of the plurality of ordered lists of top keywords, the individual ones of the plurality of reduced lists of keywords corresponding to individual ones of the plurality of ordered lists of top keywords, such that a keyword from the plurality of ordered lists of top keywords appears in no more than a predetermined number of reduced lists of keywords of the plurality of reduced lists of keywords.

13. The system according to claim 12 wherein the matching algorithm comprises a hospital-residents matching algorithm and individual ones of the plurality of ordered lists of top keywords are used to indicate topic preferences for keywords.

14. The system according to claim 13 wherein the hospital-residents matching algorithm assumes the keywords have no preference between the topics.

15. The system according to claim 12 wherein the predetermined number of reduced lists of keywords is one.

16. The system according to claim 12 wherein the topic modeling comprises Latent Dirichlet Allocation (LDA)-type topic modeling.

17. The system according to claim 12 wherein the subset of keywords includes at most a predetermined maximum number of keywords.

18. The system according to claim 17 wherein the subset of keywords includes a predetermined number of keywords.

19. The system according to claim 17 wherein the subset of keywords includes less than the predetermined maximum number of keywords based at least in part on a predetermined computational criterion establishing theme name quality sufficiency being satisfied.

20. The system according to claim 12 wherein the ordered list of words comprises a predetermined number of keywords following removal of the one or more words at the bottom of the ordered list of words.

\* \* \* \* \*